United States Patent
Sankaran

(10) Patent No.: US 7,457,362 B2
(45) Date of Patent: Nov. 25, 2008

(54) LOOP DEBLOCK FILTERING OF BLOCK CODED VIDEO IN A VERY LONG INSTRUCTION WORD PROCESSOR

(75) Inventor: Jagadeesh Sankaran, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 872 days.

(21) Appl. No.: 10/973,496

(22) Filed: Oct. 25, 2004

(65) Prior Publication Data

US 2005/0117653 A1    Jun. 2, 2005

Related U.S. Application Data

(60) Provisional application No. 60/514,309, filed on Oct. 24, 2003.

(51) Int. Cl.
*H04N 7/12* (2006.01)

(52) U.S. Cl. .............. 375/240.24; 375/240; 375/240.01; 375/240.12; 375/240.29

(58) Field of Classification Search .............. 375/240, 375/240.01, 240.12, 240.24, 240.29; 382/239, 382/268
See application file for complete search history.

(56) References Cited

U.S. PATENT DOCUMENTS 6,041,145 A * 3/2000 Hayashi et al. .............. 382/268
2004/0213470 A1 * 10/2004 Sato et al. ................... 382/239

* cited by examiner

*Primary Examiner*—Allen Wong
(74) *Attorney, Agent, or Firm*—Robert D. Marshall, Jr.; W. James Brady; Frederick J. Telecky, Jr.

(57) ABSTRACT

This invention is applicable to filtering block artifacts of macroblock and block oriented video compression. This invention computes all possible filter results speculatively and simultaneously in parallel, computes conditions for application of corresponding filter results simultaneously in parallel, and writes filter results to memory conditionally dependent upon computed corresponding conditions. This invention permits effective block filtering on a very long instruction word data processor.

4 Claims, 8 Drawing Sheets

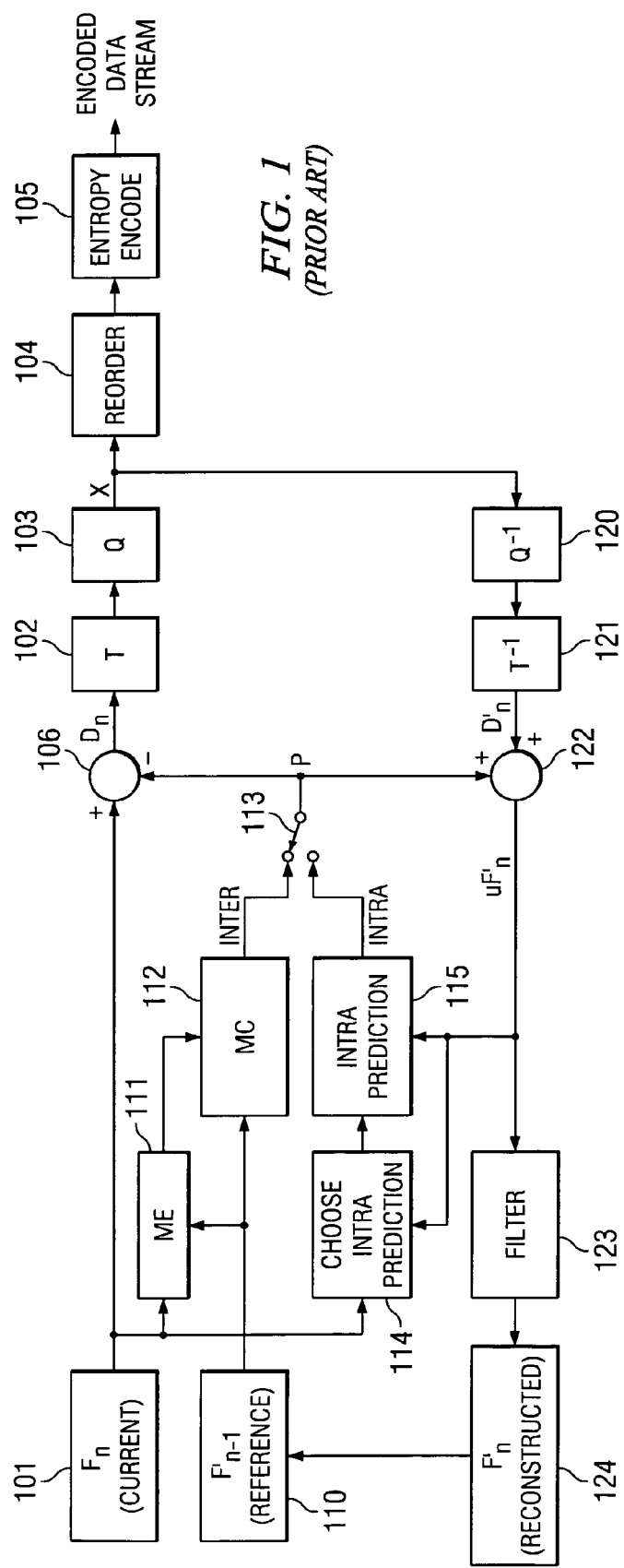
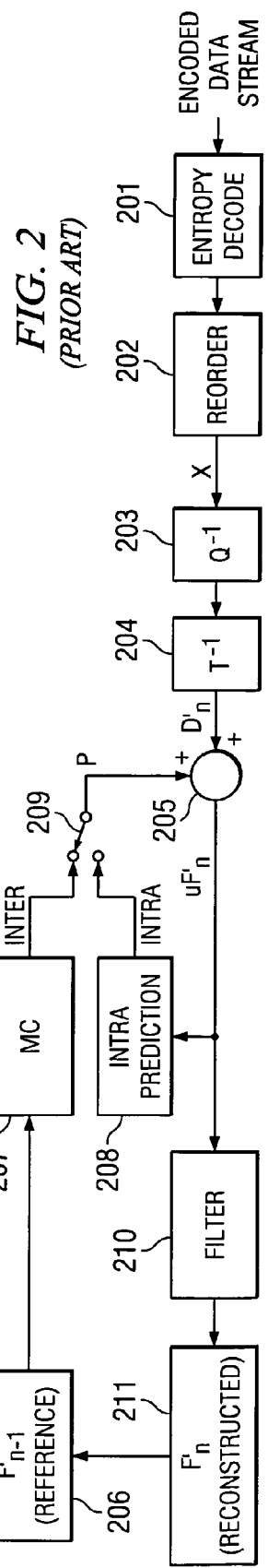
FIG. 1 *(PRIOR ART)*
FIG. 2 *(PRIOR ART)*

BOUNDARY FILTERING:
16x16 LUMA

8x8 CHROMA

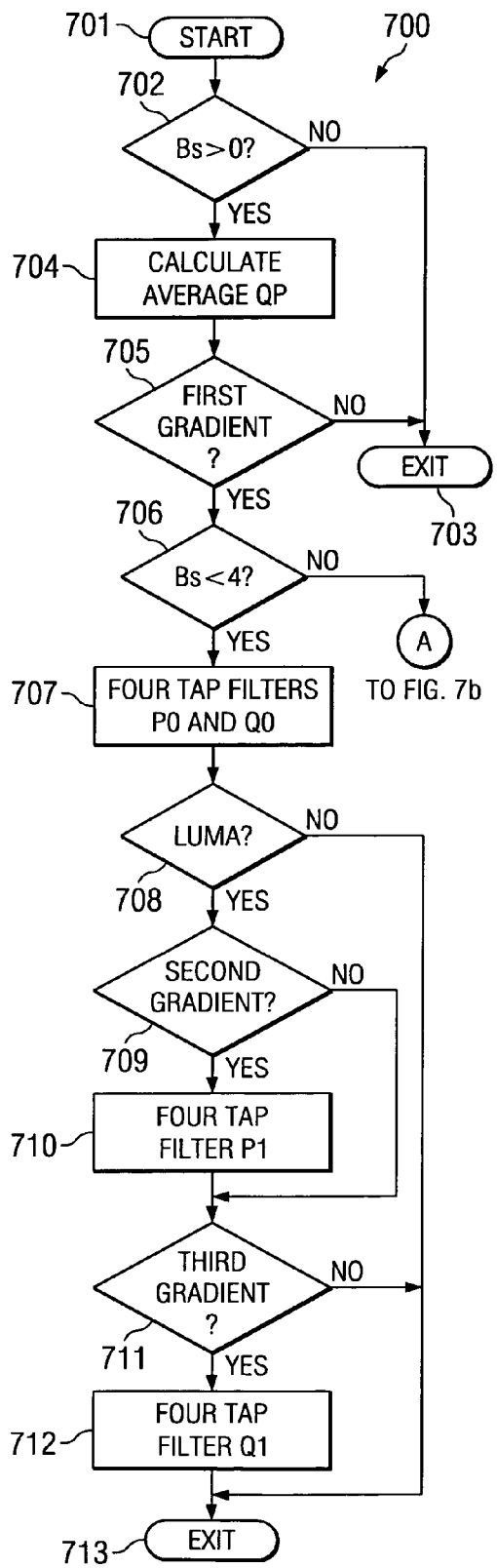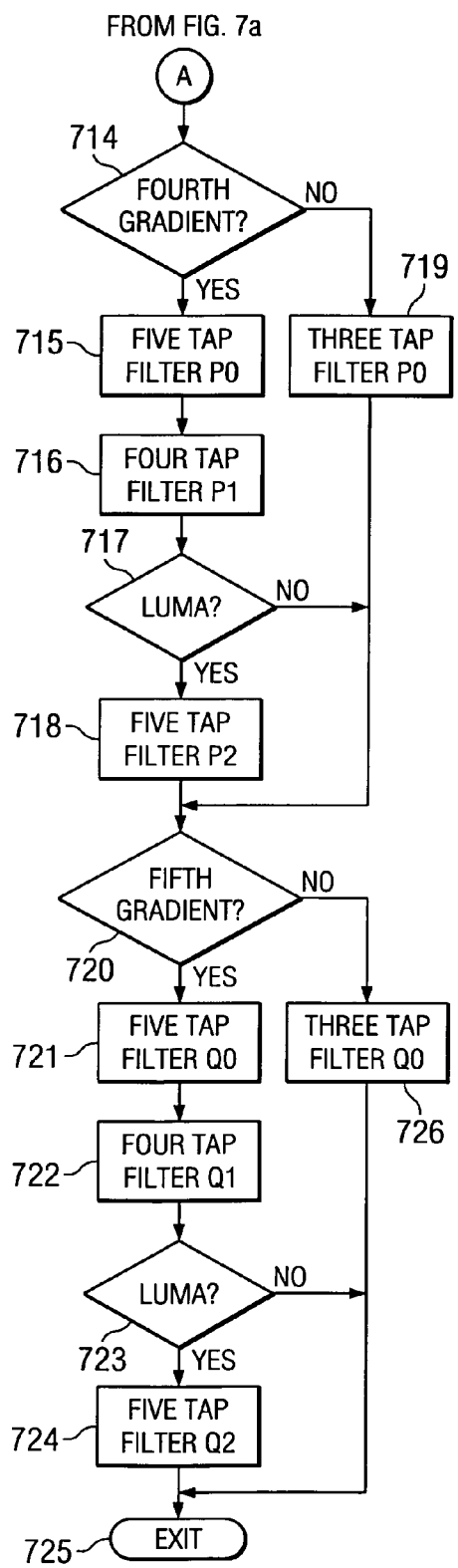
*FIG. 7a*
(PRIOR ART)
*FIG. 7b*
(PRIOR ART)

LOOP DEBLOCK FILTERING OF BLOCK CODED VIDEO IN A VERY LONG INSTRUCTION WORD PROCESSOR

CLAIM OF PRIORITY UNDER 35 §119(e) (1)

This application claims priority under 35 U.S.C. §119(e) (1) from U.S. Provisional Application No. 60/514,309 filed Oct. 24, 2003.

TECHNICAL FIELD OF THE INVENTION

The technical field of this invention is data processing in video compression and decompression.

BACKGROUND OF THE INVENTION

One near universal aspect of video compression standards creates problems. Most video compression standards divide each input field or frame into blocks and macroblocks of fixed size. Pixels within these macroblocks are considered as a group without reference to pixels in other macroblocks. A typical technique involves transformation of the pixel data into a spatial frequency domain, such as via a discrete cosine transform (DCT). This frequency domain data is quantized and encoded from low frequency to high frequency. Most of the energy in the frequency domain data is usually concentrated in the low frequencies. Thus an end of block symbol enables truncation of coding high frequency symbols. The resulting quantized data is typically entropy coded. In entropy coding more frequently used symbols are coded with fewer bits than less frequently used symbols. The net result is a reduction in the amount of data needed to encode video.

This coding in separate macroblocks can create coding artifacts at the block and macroblock boundaries. Because adjacent macroblocks may be encoded differently, the image may not mesh well at the macroblock boundary. For example, other features of the macroblock may cause a different quantization parameter. Upon decoding, the same color or gray-scale value at the macroblock boundary may be displayed differently based upon this different quantization.

Recently the H.264 standard has proposed deblock filtering at the block boundaries for both encoding and decoding. This deblocking can enhance the perceived image quality by reducing blocking artifacts based upon block and macroblock encoding. The deblocking technique adopted in this standard requires an extensive decision matrix to determine whether to filter on block edges and which filter to employ. The standards group has published proposed program code to implement this deblocking. The proposed program code includes extensive conditional branching. This makes the code unsuitable for deeply pipelined processors and application specific integrated circuit (ASIC) implementations. In addition, this proposed program code exposes little parallelism. This makes this proposed program code unsuitable for very long instruction word (VLIW) processors and parallel hardware implementations. This is particularly unfortunate in the case of VLIW processors, which are otherwise well suited to video encoding/decoding applications.

SUMMARY OF THE INVENTION

The methods of this invention can be adapted to both software and hardware pipelined machines. This invention is a method of exposing the inherent parallelism in this algorithm despite the conditional nature of the code.

This invention is applicable to filtering block artifacts of macroblock and block oriented video compression. This invention computes all possible filter results speculatively and simultaneously in parallel, computes conditions for application of corresponding filter results simultaneously in parallel, and writes filter results to memory conditionally dependent upon computed corresponding conditions. This invention permits effective block filtering on a very long instruction word data processor.

BRIEF DESCRIPTION OF THE DRAWINGS

These and other aspects of this invention are illustrated in the drawings, in which:

FIG. 1 illustrates an overview of the video encoding process of the prior art;

FIG. 2 illustrates an overview of the video decoding processor the prior art;

FIGS. 7a and 7b together illustrate the block filtering process according to the prior art;

DETAILED DESCRIPTION OF PREFERRED EMBODIMENTS

Figure 3A:
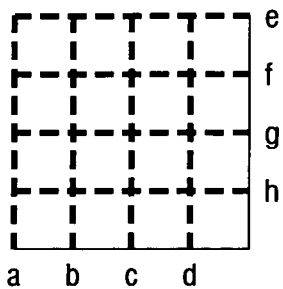
FIG. 3 is a flow chart illustrating the deblocking process according to the H.264 standard of the prior art.

FIG. 1 illustrates the encoding process 100 of video encoding according to the prior art. Many video encoding standards use similar processes such as represented in FIG. 1. Encoding process 100 begins with the n th frame $F_n$ 101. Frequency transform block 102 transforms a macroblock of the pixel data into the spatial frequency domain. This typically involves a discrete cosine transform (DCT). This frequency domain data is quantized in quantization block 103. This quantization typically takes into account the range of data values for the current macroblock. Thus differing macroblocks may have differing quantizations. In accordance with the H.264 standard, in the base profile the macroblock data may be arbitrarily reordered via reorder block 104. As will be explained below, this reordering is reversed upon decoding. Other video encoding standards and the H.264 main profile transmit data for the macroblocks in strict raster scan order. The quantized data is encoded by entropy encoding block 105. Entropy encoding employs fewer bits to encode more frequently used symbols and more bits to encode less frequency used symbols. This process reduces the amount of encoded that must be transmitted and/or stored. The resulting entropy encoded data is the encoded data stream.

Video encoding standards typically permit two types of predictions. In inter-frame prediction, data is compared with data from the corresponding location of another frame. In intra-frame prediction, data is compared with data from another location in the same frame.

For inter prediction, data from (n-1)th frame $F_{n-1}$ 110 and data from the current frame $F_n$ 101 supply motion estimation block 111. Motion estimation block 111 determines the positions and motion vectors of moving objects within the picture. This motion data is supplied to motion compensation block 112 along with data from frame $F_{n-1}$ 110. The resulting motion compensated frame data is selected by switch 113 for application to subtraction unit 106. Subtraction unit 106 subtracts the inter prediction data from switch 113 from the input frame data from current frame $F_n$ 101. Thus frequency transform block 102, quantization block 103, reorder block 104 and entropy encoding block 105 encode the differential data rather than the original frame data. Assuming there is relatively little change from frame to frame, this differential data has a smaller magnitude than the raw frame data. Thus this can be expressed in fewer bits contributing to data compression. This is true even if motion estimation block 111 and motion compensation block 112 find no moving objects to code. If the current frame $F_n$ and the prior frame $F_{n-1}$ are identical, the subtraction unit 106 will produce a string of zeros for data. This data string can be encoded using few bits.

The second type of prediction is intra prediction. Intra prediction predicts a macroblock of the current frame from another macroblock of that frame. Inverse quantization block 120 receives the quantized data from quantization block 103 and substantially recovers the original frequency domain data. Inverse frequency transform block 121 transforms the frequency domain data from inverse quantization block 120 back to the spatial domain. This spatial domain data supplies one input of addition unit 122, whose function will be further described. Encoding process 100 includes choose intra predication unit 114 to determine whether to implement intra prediction. Choose intra prediction unit 114 receives data from current frame $F_n$ 101 and the output of addition unit 122. Choose intra prediction unit 114 signals intra prediction intra predication unit 115, which also receives the output of addition unit 122. Switch 113 selects the intra prediction output for application to the subtraction input of subtraction units 106 and an addition input of addition unit 122. Intra prediction is based upon the recovered data from inverse quantization block 120 and inverse frequency transform block 121 in order to better match the processing at decoding. If the encoding used the original frame, there might be drift between these processes resulting in growing errors.

Encoding process 100 includes reconstruction of the frame based upon this recovered data. The output of addition unit 122 supplies deblock filter 123. Deblock filter 123 smoothes artifacts created by the block and macroblock nature of the encoding process. The result is reconstructed frame $F''_n$ 124.

As shown schematically in FIG. 1, this reconstructed frame $F''_n$ 124 becomes the next reference frame $F_{n-1}$ 110.

FIG. 2 illustrates the corresponding decoding process 200. Entropy decode unit 201 receives the encoded data stream. Entropy decode unit 201 recovers the symbols from the entropy encoding of entropy encoding unit 105. Reorder unit 202 assembles the macroblocks in raster scan order reversing the reordering of reorder unit 104. Inverse quantization block 203 receives the quantized data from reorder unit 202 and substantially recovers the original frequency domain data. Inverse frequency transform block 204 transforms the frequency domain data from inverse quantization block 203 back to the spatial domain. This spatial domain data supplies one input of addition unit 205. The other input of addition input 205 comes from switch 209. In inter mode switch 209 selects the output of motion compensation unit 207. Motion compensation unit 207 receives the reference frame $F'_{n-1}$ 206 and applies the motion compensation computed by motion compensation unit 112 and transmitted in the encoded data stream.

Switch 209 may also select intra prediction. The intra prediction is signaled in the encoded data stream. If this is selected, intra prediction unit 208 forms the predicted data from the output of adder 205 and then applies the intra prediction computed by intra prediction block 115 of the encoding process 100. Addition unit 205 recovers the predicted frame.

The output of addition unit 205 supplies the input of deblock filter 210. Deblock filter 210 smoothes artifacts created by the block and macroblock nature of the encoding process. The result is reconstructed frame $F'_n$ 211. As shown schematically in FIG. 2, this reconstructed frame $F'_n$ 211 becomes the next reference frame $F_{n-1}$ 206.

The deblocking filtering of deblock filter 123 and deblock 210 must be the same. This enables the decoding process to accurately reflect the input frame $F_n$ 101 without error drift. The H.264 standard has a specific, very detailed decision matrix and corresponding filter operations for this process. The standard deblock filtering is applied to every macroblock in raster scan order. This deblock filtering smoothes artifacts created by the block and macroblock nature of the encoding. The filtered macroblock is used as the reference frame in predicted frames in both encoding and decoding. The encoding and decoding apply the identical processing the reconstructed frame to reduce the residual error after prediction.

Figure 3B:
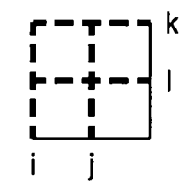

FIGS. 3a and 3b illustrate references to the boundaries that will be used in the description of the deblock filtering. First, macroblock edges that are also picture edges are not filtered. The input frame data provides no input for pixels outside the frame and thus any deblock filtering at picture edges would be speculative. The deblock filtering is applied to 4 by 4 pixels in 16 by 16 pixel macroblocks. FIG. 3a illustrates one 16 by 16 pixel luma macroblock. FIG. 3b illustrates a corresponding 8 by 8 pixel chroma block. Color pictures are typically sub-sampled in chroma because human perception is less sensitive to chroma changes than to luma changes. It is known in the art to provide two chroma components corresponding to each luma component, but only one is illustrated in FIG. 3b.

FIG. 3a illustrates reference to luma vertical edges a, b, c, d and e and reference to horizontal edges e, f, g and h. Each luma macroblock is deblock filtered first at vertical edges a, b, c and d in that order. Edge a is deblock filtered only if there is data from an adjacent macroblock on the left, that is, only if this edge is not a picture edge. The right most edge (not referenced in FIG. 3a) is filtered with the next macroblock to the right. If there is no such macroblock, this is a picture edge and is not filtered. Following the vertical boundary filtering, horizontal edges e, f, g and h are filtered in that order. Edge e is not filtered if the macroblock is at the top of the picture and this is a picture edge. The bottom edge (not referenced in FIG. 3a) is filtered with the next lower macroblock. If there is no such macroblock, this is a picture edge and is not filtered.

A similar process occurs for each of two chroma blocks, one of which is illustrated in FIG. 3b. Each such macroblock is first filtered on vertical edges i and then j. Edge i is not filtered if this is a picture edge. The rightmost vertical edge (not referenced in FIG. 3b) is filtered with the next chroma macroblock to the right, if any. Following filtering on the vertical edges, the deblock filter filters the horizontal edge k and then l. Note that edge k is not filtered if it is a picture edge. The bottom most horizontal edge (not referenced in FIG. 3b) is filtered with the chroma macroblock below the macroblock illustrated, if any.

Figure 4A:
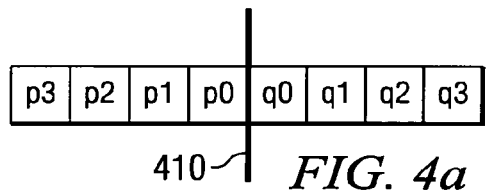
FIG. 4 illustrates the references to edges in luma and chroma macroblocks.
Figure 4B:
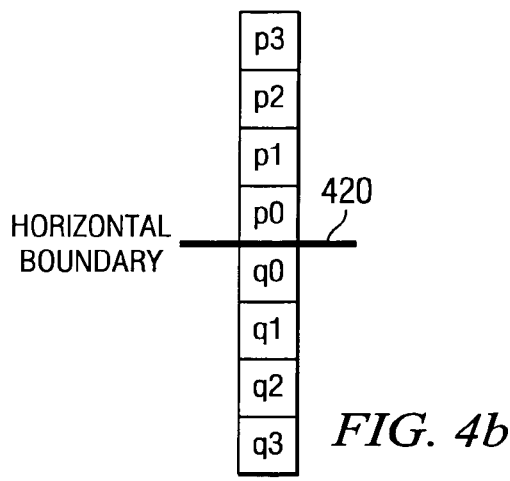

FIGS. 4a and 4b illustrate conventions used in explanation of the deblock filter. FIG. 4a illustrates the conventions used when filtering on vertical boundaries. Pixels to the left of the vertical boundary 410 are p pixels. They are numbered p0 to p3 going from nearer vertical boundary 410 to farther from vertical boundary 410. Pixels to the right of vertical boundary 410 are q pixels. These are numbered q0 through q3 in order as they get farther from vertical boundary 410. FIG. 4b illustrates the similar convention for horizontal edge 420. Pixels above horizontal edge 420 are p pixels numbered from 0 to 3 as they get farther from horizontal edge 420. Pixels below horizontal edge 420 are q pixels numbered from 0 to 3 as they get farther from horizontal edge 420. The deblock filtering specified by the H.264 standard operates on a single line at a time. Thus filtering about vertical boundary 410 involves only a single row of pixels as illustrated in FIG. 4a. Filtering about horizontal boundary 420 involves only involves as single column of pixels as illustrated in FIG. 4b. The pixel designations illustrated in FIGS. 4a and 4b enable the same filtering function to be used for vertical edges 410 and horizontal edges 420.

The particular filtering applied to any particular edge within any particular block and macroblock depends upon two factors, boundary strength and gradient. The boundary strength (Bs) factor depends upon the quality of the boundary. Boundary strength ranges from the weakest Bs=0, which signals no filtering, to the strongest Bs=4. The boundary strength is larger for boundary qualities likely to produce the worst block artifacts. The criteria for determination of this boundary strength is noted below in Table 1.

TABLE 1

| Criteria | Bs |
|---|---|
| Either p or q is intra coded;<br>AND<br>The boundary is a macroblock boundary | 4 |
| Either p or q is intra coded;<br>AND<br>The boundary is not a macroblock boundary | 3 |
| Neither p nor q is intra coded;<br>AND<br>Either p or q include non-zero coefficients | 2 |
| Neither p nor q is intra coded;<br>AND<br>Neither p nor q include non-zero coefficients;<br>AND<br>(p and q have different reference frames;<br>OR<br>p and q have a different number of reference frames;<br>OR<br>p and q have different motion vectors) | 1 |

TABLE 1-continued

| Criteria | Bs |
|---|---|
| Neither p nor q is intra coded;<br>AND<br>Neither p nor q include non-zero coefficients;<br>AND<br>p and q have the same reference frame;<br>AND<br>p and q have the same motion vector | 0 |

In accordance with the H.264 standard no deblock filtering takes place for a Bs of 0. If the Bs>0, then deblock filtering can take place if the gradient at the boundary meets certain criteria. Initially, deblock filtering is enabled for Bs>0 if the following absolute value of differences |p0-q0|, |p1-p0| and |q1-q0| are each less than a threshold corresponding threshold.

Figure 5:
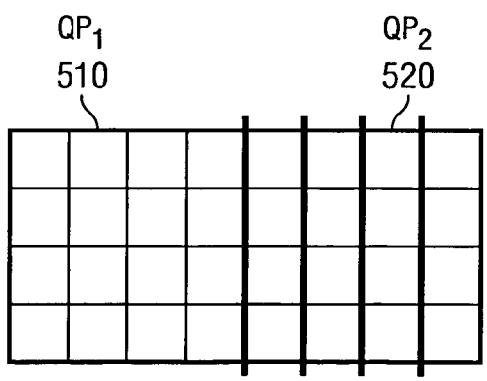
FIG. 5 illustrates the references to pixels at vertical block boundaries showing the computation of average quantization parameter.

The thresholds vary based upon the average quantization parameter (QP) of the p and q blocks adjacent to the boundary. These thresholds are least for low average QPs and highest for high average QPs. FIG. 5 illustrates the manner of computing the average quantization parameter for selection of the thresholds. The quantization parameter is typically selected on a macroblock basis. Each block within a macroblock will have the same quantization parameter. In FIG. 5, macroblock 510 has a quantization parameter of $QP_1$. Macroblock 520 has a quantization parameter of $QP_2$. For vertical edge a within macroblock 520 the average QP is $(QP_1+QP_2)/2$. For vertical edges b, c and d within macroblock 520 the average QP is $(QP_2+QP_2)/2=QP_2$. A similar calculation holds for horizontal edges e, f, g and h.

A change in absolute value greater than the corresponding threshold is assumed to be a real part of the image and should not be filtered. The magnitude of possible block artifacts increase with increasing QP, so higher thresholds are appropriate for higher QPs.

Generally for 0<Bs<4, the filtering includes two 4-tap linear filters having inputs p1, p0, q0 and q1. A first of these filters produces a filtered output P0 to replace original p0. The second of these filters produces a filtered output Q0 which replaces original q0. For luma blocks, if |p2-p0| is less than a corresponding threshold, a 4-tap linear filter with inputs p2, p1, p0 and q0 produces the filtered output P1 to replace p1. If |q2-q0| is less than the threshold, a 4-tap linear filter with inputs q2, q1, q0 and p0 produces the filtered output Q1 to replace q1. The pixels p1 and q1 are not filtered for chroma blocks. The exact 4-tap filters implemented in these cases may depend upon the boundary strength values.

The process is more complex for Bs=4. If |p2-p0| is less than the threshold and |p0-q0| less than one quarter of the threshold rounded, then a 5-tap filter with inputs p2, p1, p0, q0 and q1 produces P0 and a 4-tap filter with inputs p2, p1, p0 and q0 produces Q0. If this threshold criteria is met, then for luma blocks only another 3-tap filter with inputs p3, p2, p1, p0 and q0 produces P2. If the threshold criteria is not met, then a 3-tap filter with inputs p1, p0 and q1 produces P0. A similar process is used to generate outputs on the q side. If |q2-q0| is less than the corresponding threshold and |p0-q0| is less than one quarter of the threshold rounded, then a 5-tap filter with input q2, q1, q0, p0 and p1 produces Q0 and a 4-tap filter with inputs q2, q1, q0 and p0 produces Q1. If this threshold criteria is met, for luma blocks only a 5-tap filter with inputs q3, q2, q1, q0 and p0 produces Q2. If the threshold criteria is not met, then a 3-tap filter with inputs q1, q0 and p1 produces Q0.

The H.264 committee presented a C code implementation of the loop deblocking. There are several problems with this known technique. The conventional loop deblocking code as written is bifurcated into two cases. In the first case Bs=4. The second case covers other values of Bs. As outlined above, the Bs=4 filter is computationally more intensive than the other cases. Further in the proposed code above, the strength is checked once for every block of a macroblock.

The only allowed strength values if filtering is performed for intra frames are 4 and 3. For inter frames, all possible values of strength are allowed including 4, 3, 2, 1 and 0. A boundary strength value of 0 implies that filtering for this block should be skipped.

Figure 6:
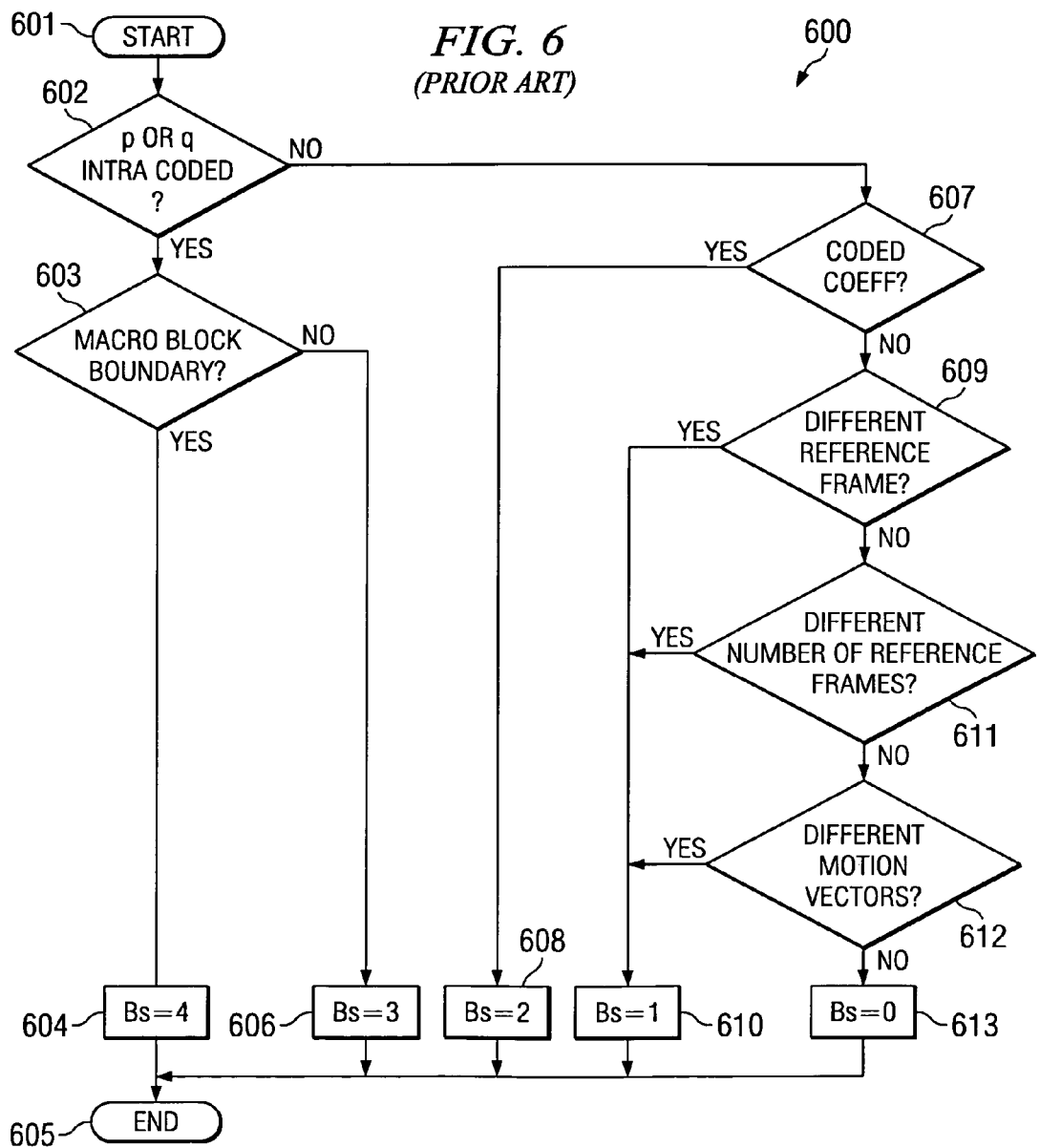
FIG. 6 illustrates the boundary strength determination according to the prior art.

FIGS. 6, 7a and 7b illustrate the operation of the loop deblocking filter proposed by the H.264 committee. FIG. 6 illustrates determination of the boundary strength. FIGS. 7a and 7b together illustrate the gradient determinations and the selection of filters.

Process 600 begins at start block 601. Process 600 first tests to determine if either the p or q pixels are part of an intra coded macroblock (decision block 602). If so (Yes at decision block 602), then process 600 tests to determine in the edge under consideration is a macroblock edge (decision block 603). If so (Yes at decision block 603), then the boundary strength is 4 (processing block 604). Process 600 ends at exit block 605. If not (No at decision block 603), then the boundary strength is 3 (processing block 606). Process 600 ends at exit block 605.

In the event that neither the p nor the q pixels are part of a intra coded macroblock (No at decision block 602), then process 600 tests to determine if either of the p or q pixels are coded coefficients (non-zero) (decision block 607). If either of the p or q pixels are non-zero coded pixels (Yes at decision block 607), then the boundary strength is 2 (processing block 608). Process 600 ends at exit block 605.

If both the p and q pixels are zero (No at decision block 607), process 600 tests to determine if the p and q blocks have different reference frames (decision block 609). If the p and q blocks have different reference frames (Yes at decision block 609), then the boundary strength is 1 (processing block 610). Process 600 ends at exit block 605.

If both the p and q blocks have the same reference frames (No at decision block 609), process 600 tests to determine if the p and q blocks have a different number of reference frames (decision block 611). If the p and q blocks have a different number of reference frames (Yes at decision block 611), then the boundary strength is 1 (processing block 610). Process 600 ends at exit block 605.

If both the p and q blocks have the same number of reference frames (No at decision block 611), process 600 tests to determine if the p and q blocks have different motion vectors (decision block 612). If the p and q blocks have different motion vectors (Yes at decision block 611), then the boundary strength is 1 (processing block 610). Process 600 ends at exit block 605. If the p and q blocks have the same motion vectors (no at decision block 612), then the boundary strength is 0 (processing block 613). Process 600 ends at exit block 605.

FIGS. 7a and 7b together illustrate the prior art technique for implementing the determining the block filtering to apply. Process 700 begins with start block 701. Process 700 tests to determine if the boundary strength is greater than zero (decision block 702). If not (no at decision block 701), then the boundary strength is zero and no block filtering should take place. Accordingly, process 700 ends via exit block 703.

If the boundary strength is greater than zero (yes at decision block 702), then process 700 calculates the average quantization parameter (processing block 704). As noted above the gradient determinations are set relative to the quantization parameter of the macroblock or macroblocks involved. In process 700 the average quantization parameter is normalized as a pointer into tables holding the corresponding gradient thresholds.

Process 700 determines if the p and q pixels satisfy the first gradient determination (decision block 705). As stated above, this first gradient determination tests if $|p0-q0|<A1_{Bs}$, $|p1-p0|<A2_{Bs}$ and $|q1-q0|<A2_{Bs}$. The subscript Bs indicates that these thresholds are dependent upon the edge boundary strength. If not (no at decision block 705), then no block filtering takes place. Process 700 ends via exit block 703. If the gradients are less than the respective thresholds (yes at decision block 705), then process 700 tests to determine if the boundary strength is less than 4 (decision block 706). If not (no at decision block 706), then the boundary strength is 4 and process 700 branches to processing for boundary strength 4 at A. FIG. 7b illustrates this part of process 700.

If the boundary strength is less than 4 (yes at decision block 706), then process 700 begins the block filtering (processing block 707). Pixel p0 is replaced by a four tap linear filtering of pixels p1, p0, q0 and q1. Pixel q0 is similarly replaced by a four tap linear filter of pixels p1, p0, q0 and q1.

Process 700 next tests to determine if the current macroblock is a luma macroblock (decision block 708). In this case there are two filters applied only to luma macroblocks and not to chroma macroblocks. If this macroblock is a luma macroblock (yes at decision block 708), then process 700 makes a second gradient determination (decision block 709). This second gradient determination is whether $|p2-p0|<B_{Bs}$. If so (yes at decision block 709), then pixel p1 is replaced by a four tap linear filter of pixels p2, p1, p0 and q0.

If the second gradient test fails (no at decision block 709) and following the filtering of processing block 710, process 700 makes a third gradient determination (decision block 711). This third gradient determines whether $|q2-q0|<C_{Bs}$. If so (yes at decision block 711), then pixel q1 is replaced by a four tap linear filter of pixels p0, q0, q1 and q2.

If the macroblock is not a luma macroblock (no at decision block 708) or if the third gradient test fails (no at decision block 711) and following the filtering of processing block 712 process 700 ends via exit block 713.

FIG. 7b illustrates the portion of process 700 handling the case of a boundary strength of 4. This process is entered via A from decision block 706 illustrated in FIG. 7a. Process 700 performs a fourth gradient test (decision block 714). This fourth gradient test determines whether $|p2-p0|<D_{BS}$ and $|p0-q0|<\mathrm{round}(D_{BS}/4)$. If so (yes at decision block 714), then process 700 replaces pixel p0 with a five tap linear filter of p2, p1, p0, q0 and q1 (processing block 715) and replaces pixel p1 with a four tap linear filter of p2, p1, p0 and q0 (processing block 716).

Process 700 tests to determine if the macroblock is a luma macroblock (decision block 717). If so (yes at decision block 717), the process 700 replaces pixel p2 with a five tap linear filter of p3, p2, p1, p0 and q0 (processing block 718).

If the fourth gradient test fails (no at decision block 714), then process 700 replaces pixel p0 with a three tap linear filter of p1, p0 and q1 (processing block 719).

Process 700 performs a fifth gradient test (decision block 720) if the macroblock was not a luma macroblock (no at decision block 717), following processing block 718 and following processing block 719. This fifth gradient test determines whether $|q2-q0|<E_{Bs}$ and $|p0-q0|<\mathrm{round}(E_{Bs}/4)$. If so (yes at decision block 720), then process 700 replaces pixel q0 with a five tap linear filter of p1, p0, q0, q1 and q2 (processing block 721) and replaces pixel q1 with a four tap linear filter of p0, q0, q1 and q2 (processing block 722).

Process 700 tests to determine if the macroblock is a luma macroblock (decision block 723). If so (yes at decision block 723), the process 700 replaces pixel q2 with a five tap linear filter of p0, q0, q1, q2 and q3 (processing block 724).

If the fifth gradient test fails (no at decision block 720), then process 700 replaces pixel q0 with a three tap linear filter of p1, q0 and q1 (processing block 726).

Process 700 ends at exit block 725 if the macroblock was not a luma macroblock (no at decision block 723), following processing block 724 and following processing block 726.

This committee proposed code involves conditional program flow. This conditional program flow makes the development of a software pipelined loop implementation impossible. The committee proposed code schedules poorly on very long instruction word (VLIW) architectures such as the Texas Instruments TMS320C6200 and TMs320C6400 digital signal processors (DSP).

This invention is an efficient pipelined loop deblocking implementation. The code to perform loop deblocking is divided into separate cases for intra and inter frames. Intra frames are separated into cases of Bs=4 and Bs=3 for vertical and horizontal filtering. For intra frames the strength is not checked because all blocks on a vertical edge have the same Bs of either 4 or 3. For inter frames the Bs array is initially parsed and the addresses of the edges needing filtering are pre-computed and stored. Blocks having a boundary strength of 0 are skipped. A pipelined version of the code works for as few as 4 individual pixels on an edge. Thus this implementation can be used to filter any Bs from as few as one block to N blocks safely. This invention generally deals with individual cases by speculative execution. In compiler theory for VLIW architectures this is called super-block scheduling. Parallelism within any one block of code is limited. However this super-block scheduling put together multiple, independent blocks of code permitting identification of an increased number of operations that can be issued in parallel.

Figure 8:
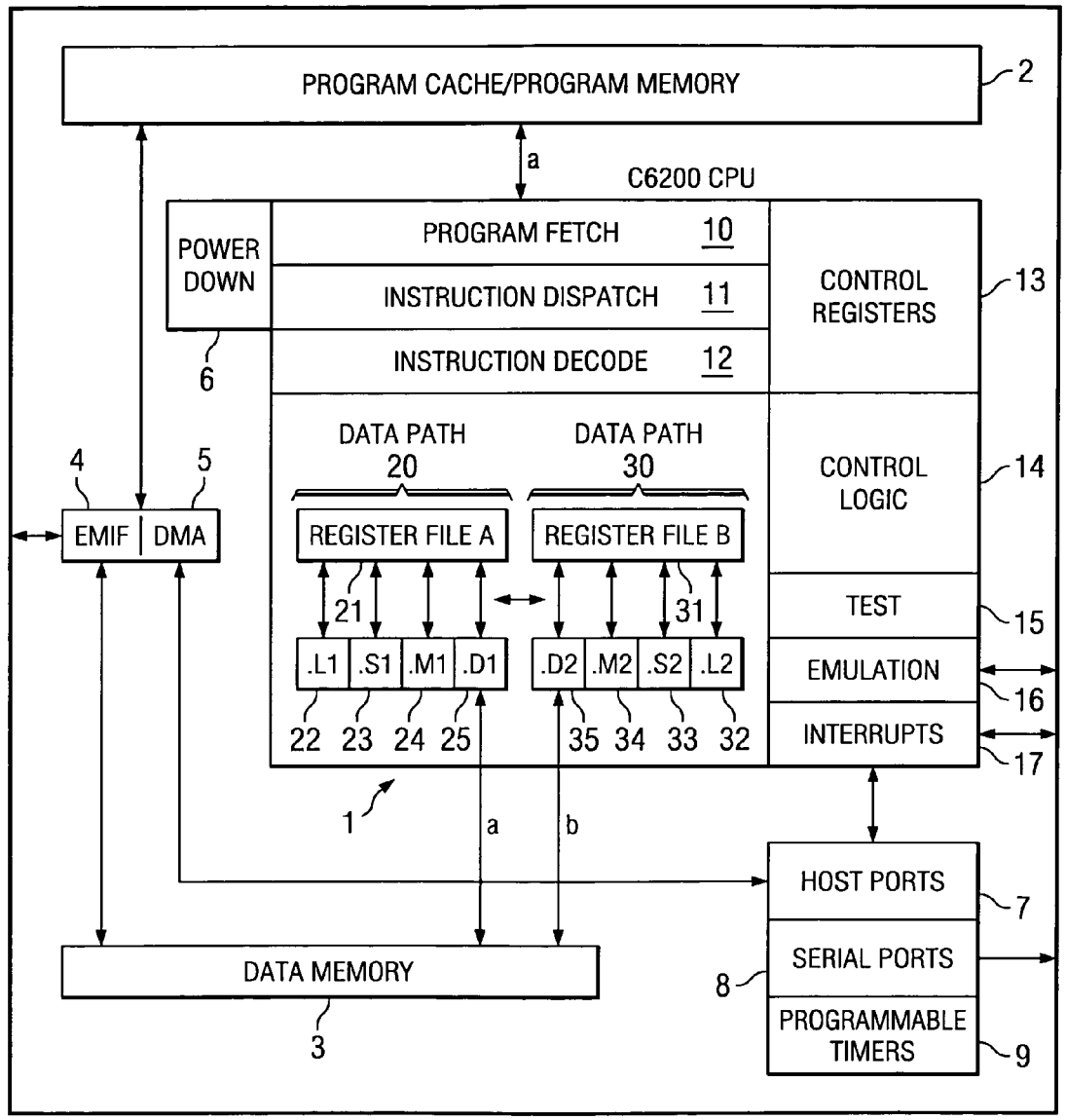
FIG. 8 illustrates the structure of a pipelined, very long instruction word data processing apparatus to which this invention is applicable.

FIG. 8 is a block diagram illustrating details of a digital signal processor core suitable for this invention such as the Texas Instruments TMS320C6000 and TMS320C6400. The digital signal processor core of FIG. 8 is a 32-bit eight-way VLIW pipelined processor. The digital signal processor includes central processing unit 1. The digital signal processor includes program memory 2 which may optionally be used as a program cache. The digital signal processor may also have varying sizes and types of data memory 3. The digital signal processor also includes peripherals 4 to 9. These peripherals preferably include an external memory interface (EMIF) 4 and a direct memory access (DMA) controller 5. External memory interface (EMIF) 4 preferably supports access to supports synchronous and asynchronous SRAM and synchronous DRAM. Direct memory access (DMA) controller 5 preferably provides 2-channel auto-boot loading direct memory access. These peripherals include power-down logic 6. Power-down logic 6 preferably can halt central processing unit activity, peripheral activity, and phase lock loop (PLL) clock synchronization activity to reduce power consumption. These peripherals also include host ports 7, serial ports 8 and programmable timers 9.

The digital signal processor core has a 32-bit, byte addressable address space. Internal memory on the same integrated circuit is preferably organized in a data space including data memory 3 and a program space including program memory 2. When off-chip memory is used, preferably these two spaces are unified into a single memory space via the external memory interface (EMIF) 4.

Data memory 3 may be internally accessed by central processing unit 1 via two internal ports 3a and 3b. Each internal port 3a and 3b preferably has 32 bits of data and a 32-bit byte address reach. Program memory 2 may be internally accessed by central processing unit 1 via a single port 2a. Port 2a of program memory 2 preferably has an instruction-fetch width of 256 bits and a 32-bit word (four bytes) address, equivalent to a 32-bit byte address.

Central processing unit 1 includes program fetch unit 10, instruction dispatch unit 11, instruction decode unit 12 and two data paths 20 and 30. First data path 20 includes four functional units designated L1 unit 22, S1 unit 23, M1 unit 24 and D1 unit 25 and 16 32-bit registers forming register file A 21. Second data path 30 likewise includes four functional units designated L2 unit 32, S2 unit 33, M2 unit 34 and D2 unit 35 and 16 32-bit registers forming register file B 31. Central processing unit 1 includes control registers 13, control logic 14, and test logic 15, emulation logic 16 and interrupt logic 17.

Program fetch unit 10, instruction dispatch unit 11 and instruction decode 12 unit recall instructions from program memory 2 and deliver up to eight 32-bit instructions to the functional units every instruction cycle. Processing occurs in each of the two data paths 20 and 30. As previously described above each data path has four corresponding functional units (L, S, M and D) and a corresponding register file containing 16 32-bit registers. Each functional unit is controlled by a 32-bit instruction. The data paths are further described below. A control register file 13 provides the means to configure and control various processor operations. A limited number of data cross paths are provided between the register file A 21 and the function units of data path 30 and between register file B 31 and the functional units of data path 20. These are illustrated schematically in FIG. 8.

This invention uses a number of techniques to expose instruction level parallelism in the loop deblocking algorithm and to reduce the conditional branching nature of the program code. Exposing instruction level parallelism permits effective use of the many functional units of the DSP of FIG. 8. Reducing the conditional branching nature of the code reduces the pipeline hits that occur in highly pipelined processors.

Figure 9:
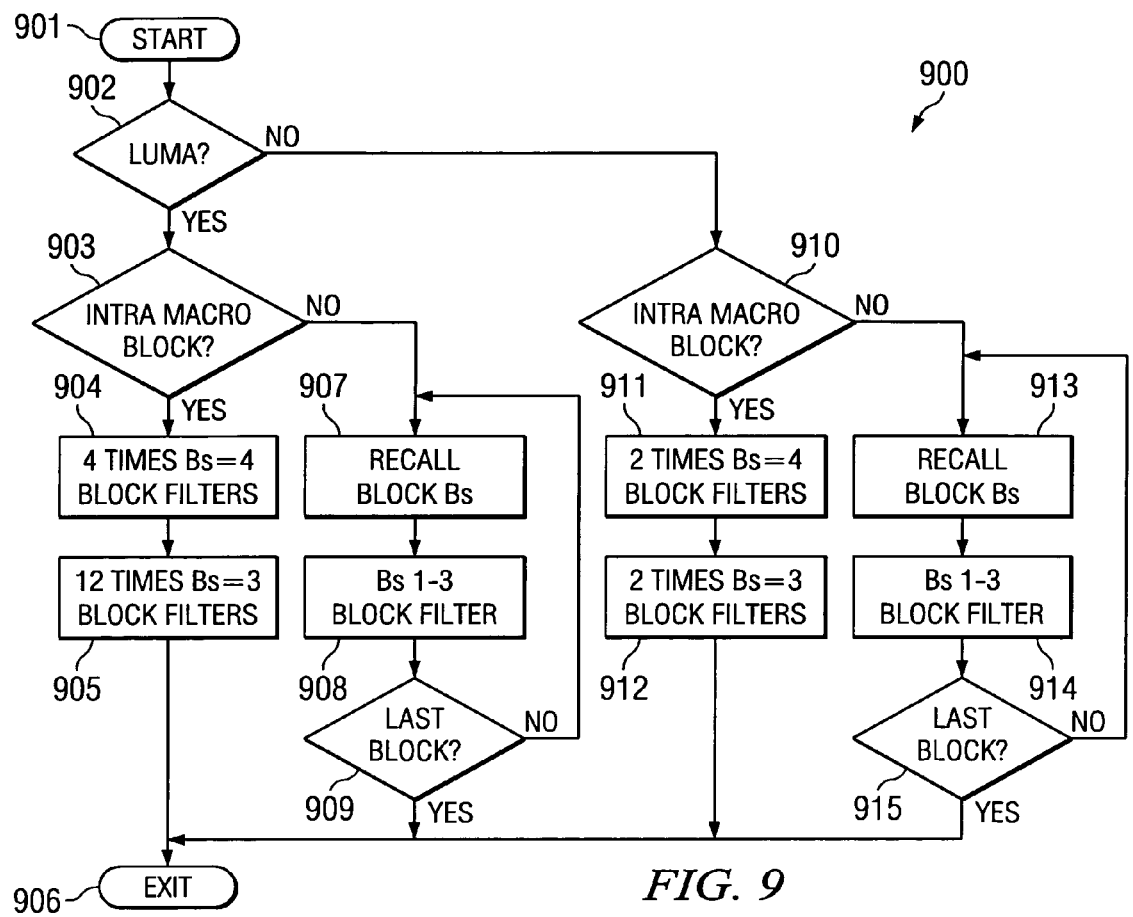
FIG. 9 illustrates an overall view of this invention for block filtering.

FIG. 9 illustrates an overview of this invention for filtering a macroblock. Process 900 begins at start block 901. Process 900 tests to determine if the current macroblock is a luma macroblock (decision block 902). As disclosed above, luma and chroma macroblocks are filtered differently. If the current macroblock is a luma macroblock (yes at decision block 902), then process 900 tests to determine if the current macroblock is an intra coded macroblock (decision block 903). If this is an intra coded macroblock (yes at decision block 903), then the pattern of boundary strengths for the sixteen blocks of the macroblock is known. The first four blocks of the macroblock corresponding to edge a (see FIG. 3a) are on a macroblock boundary. Thus these four blocks have a boundary strength of 4. As will be described below, a loop kernel covering the pixels of a single block is possible. Process 900 executes a boundary strength 4 block filtering four times (processing block 904). This filtering will be further described below. The next twelve blocks (four each edges b, c and d of FIG. 3a) have a boundary strength of 3 (processing block 905). This filtering will be further described below. Following this filtering, process 900 ends via exit block 906.

If the current macroblock is not an intra coded macroblock (no at decision block 903), then the macroblock may have a boundary strength of 1 to 4. Process 900 recalls the precalculated and stored boundary strength for the next block of this macroblock (processing block 907). The first time through this loop the next block is the first block in the macroblock. Process 900 performs the filtering for boundary strength 1 to 3 for this block (processing block 908). This filtering will be further described below. Process 900 tests to determine if this is the last block of the current macroblock (decision block 909). If this is not the last block (no at decision block 909), then process 900 recalls the boundary strength of the next block (processing block 907) and filters this block (processing block 908). If that was the last block of the macroblock (yes at decision block 909), then process 900 ends via exit block 906.

If the current macroblock is not a luma macroblock (no at decision block 902), then it must be a chroma macroblock. Process 900 tests to determine if the current macroblock is an intra coded macroblock (decision block 910). If this is an intra coded macroblock (yes at decision block 910), then the pattern of boundary strengths for the four blocks of the macroblock are known. The first two blocks of the macroblock corresponding to edge i (FIG. 3b) are on a macroblock boundary. Thus these two blocks have a boundary strength of 4. Process 900 twice executes a boundary strength 4 block filtering (processing block 911). This filtering will be further described below. The next two blocks of edges j (FIG. 3b) have boundary strength of 3 (processing block 912). Following this filtering, process 900 ends via exit block 906.

If the current macroblock is not an intra coded macroblock (no at decision block 910), then the macroblock may have a boundary strength of 1 to 4. Process 900 recalls the precalculated and stored boundary strength for the next block of this macroblock (processing block 913). Process 900 performs the filtering for boundary strength 1 to 3 for this block (processing block 914). Process 900 tests to determine if this is the last block of the current macroblock (decision block 914). If this is not the last block (no at decision block 914), then process 900 recalls the boundary strength of the next block (processing block 913) and filters this block (processing block 914). If that was the last block of the macroblock (yes at decision block 915), then process 900 ends via exit block 906.

Figure 10:
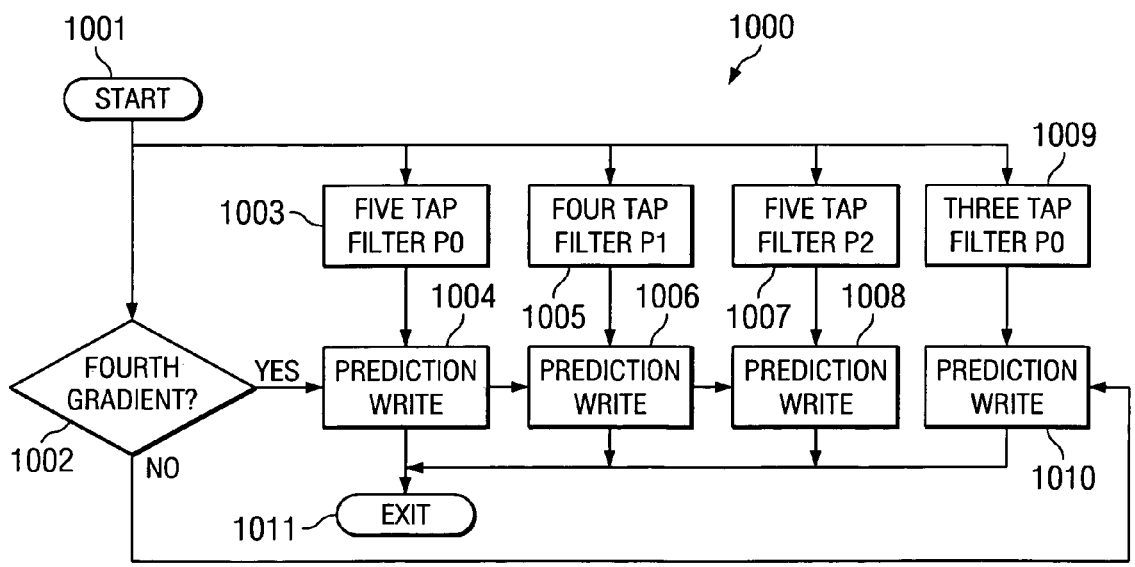
FIG. 10 illustrates the computation of p pixel filtering for luma blocks according to one aspect of this invention for boundary strength 4.

FIG. 10 illustrates schematically the process 1000 for the boundary strength 4 filtering of p pixels of a luma macroblock in this invention. This is equivalent to the left half of the method illustrated in FIG. 7b for luma macroblocks. Process 1000 is one iteration of the loop of process block 904 of FIG. 9. Process 1000 begins with start block 1001. This beginning is the same as point A illustrated in FIGS. 7a and 7b. Several processes occur simultaneously in the plural functional units illustrated in FIG. 8. The fourth gradient test (decision block 1002) is one of these simultaneous processes. At the same time process 1000 performs the five tap filter for pixel p0 (processing block 1003). The result is written to memory via a predicated memory write (processing block 1004) only if the gradient test passes (yes at decision block 1002). Also simultaneously process 1000 performs the four tap filter for pixel p1 (processing block 1005). The result is written to memory via a predicated memory write (processing block 1006) only if the gradient test passes (yes at decision block 1002). Process 1000 also simultaneously performs the five tap filer of pixel p2 (processing block 1007). The result is written to memory via a predicated memory write (processing block 1008) only if the fourth gradient test passes (yes at decision block 1002). Lastly, process 1000 performs a three tap filter of pixel p0 (processing block 1009). The result is written to memory via a predicated memory write (processing block 1010) only if the fourth gradient test fails (no at decision block 1002). Process 1000 ends via exit block 1011. A similar process overlapping similar operations operates to perform the q pixel boundary strength 4 filtering corresponding to the right half of FIG. 7b. These two processes together form the boundary strength 4 filtering for luma macroblocks.

Figure 11:
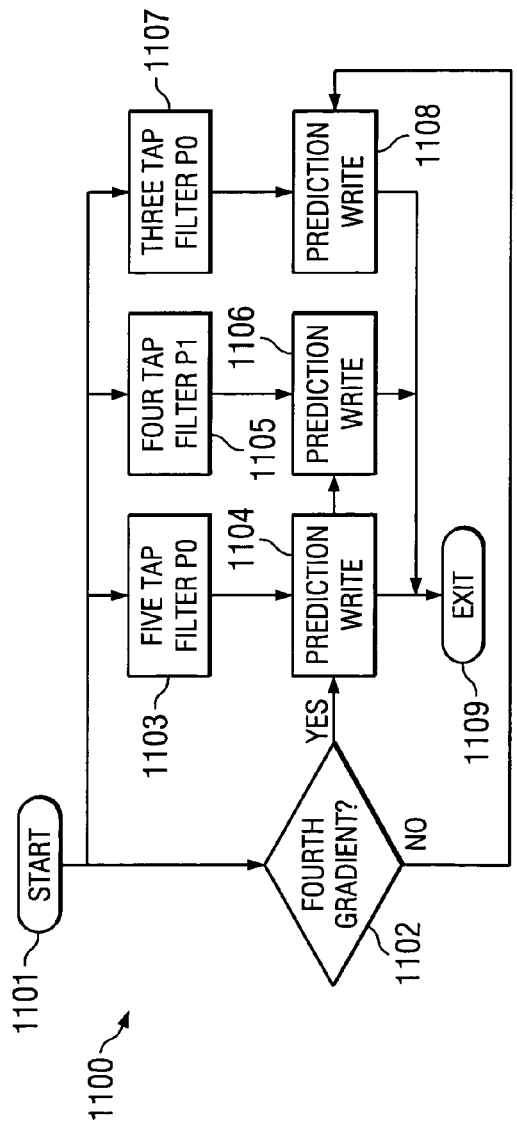
FIG. 11 illustrates the computation of p pixel filtering for chroma blocks according to one aspect of this invention for boundary strength 4.

FIG. 11 illustrates schematically the process 1100 for the boundary strength 4 filtering of p pixels of a chroma macroblock in this invention. This is equivalent to the left half of the method illustrated in FIG. 7b for chroma macroblocks. Process 1100 is one iteration of the loop of process block 911 of FIG. 9. Process 1100 begins with start block 1101. This beginning is the same as point A illustrated in FIGS. 7a and 7b. Several processes occur simultaneously in the plural functional units illustrated in FIG. 8. The fourth gradient test (decision block 1102) is one of these simultaneous processes. At the same time process 1100 performs the five tap filter for pixel p0 (processing block 1103). The result is written to memory via a predicated memory write (processing block 1104) only if the gradient test passes (yes at decision block 1102). Also simultaneously process 1100 performs the four tap filter for pixel p1 (processing block 1105). The result is written to memory via a predicated memory write (processing block 1006) only if the gradient test passes (yes at decision block 1002). Lastly, process 1100 performs a three tap filter of pixel p0 (processing block 1107). The result is written to memory via a predicated memory write (processing block 1108) only if the fourth gradient test fails (no at decision block 1102). Process 1100 ends via exit block 1109. A similar process overlapping similar operations operates to perform the q pixel boundary strength 4 filtering corresponding to the right half of FIG. 7b. These two processes together form the boundary strength 4 filtering for chroma macroblocks.

This technique enables greater parallelism by performing all the filter functions in parallel with the test functions. The results of the filter functions are written to memory only if the corresponding condition is satisfied. These conditional write operations take place in the predicated memory write operations of processing blocks 1004, 1006, 1010, 1104, 1106 and 1108. This is called speculative execution because the filter functions are performed on the speculation that they will be used. This technique will result in making unused computations. However, a very long instruction word processor such as illustrated in FIG. 8 would have unused resources if a normal conditional branch technique is used. The overlapping of speculative execution of the filter functions with the condition tests enables the filter functions to be ready for memory storage at about the same time as the results of its conditional test. This can greatly speed the execution of the deblocking function.

Figure 12:
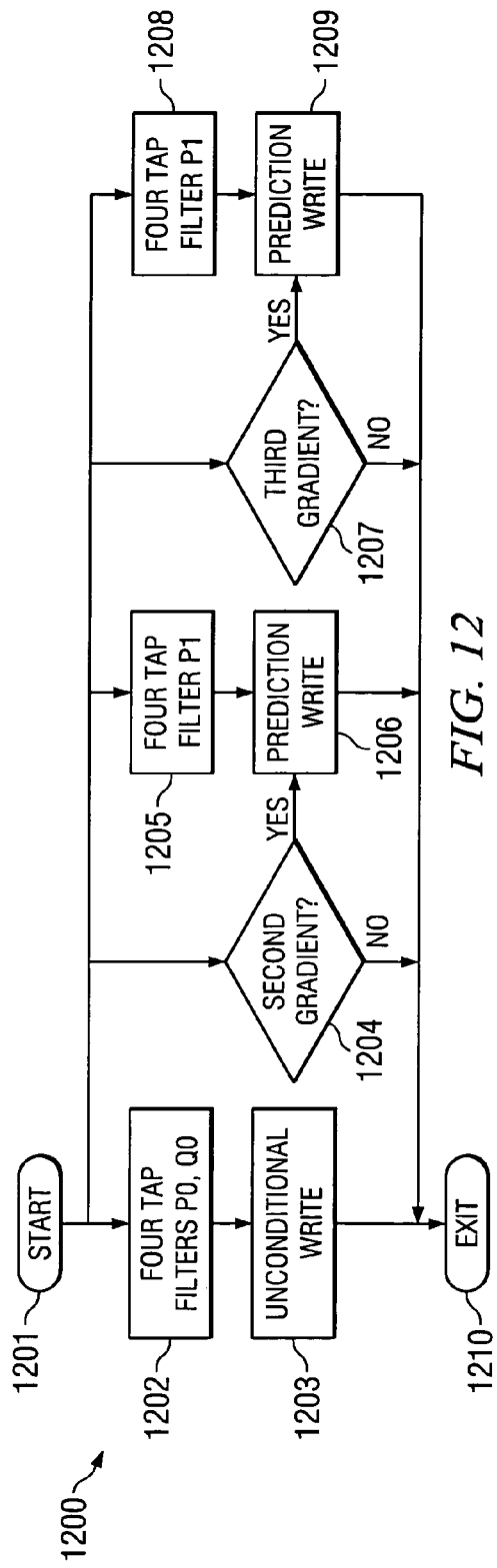
FIG. 12 illustrates the computation of p and q pixel filtering for luma blocks according to another aspect of this invention for boundary strength less than 4.

FIG. 12 illustrates process 1200 for filtering for branch strengths less than 4 for luma macroblocks. FIG. 12 performs the same function as the bottom of FIG. 7a for luma macroblocks. This corresponds to one iteration of processing block 905 and to the filtering of processing block 908 of FIG. 9. Process 1200 begins with start block 1201. This start position is the equivalent of passing the boundary strength less than four test of decision block 706 illustrated in FIG. 7a. Process 1200 begins the block filtering (processing block 1202), pixel p0 is replaced by a four tap linear filtering of pixels p1, p0, q0 and q1, and pixel q0 is similarly replaced by a four tap linear filter of pixels p1, p0, q0 and q1. This filtering operation is followed by an unconditional write to memory (processing block 1203). This filtering is not conditional upon entering process 1200. At the same time process 1200 performs the second gradient test (decision block 1304). This second gradient determination is whether $|p2-p0|<B_{Bs}$. Simultaneously process 1200 performs a four tap linear filter of for replacement of pixel p1 (processing block 1205). This result is written to memory via a predicated memory write (processing block 1206) if the second gradient test passes (yes at decision block 1204). Process 1200 also simultaneously performs the third gradient test (decision block 1207) to determine if |q2-q0|<$C_{Bs}$. Process 1200 also simultaneously performs a four tap linear filter for replacement of pixel q1 (processing block 1208). This result is written to memory via a predicated memory write (processing block 1209) if the third gradient test passes (yes at decision block 1109). Process 1200 ends via exit block 1210.

Figure 13:
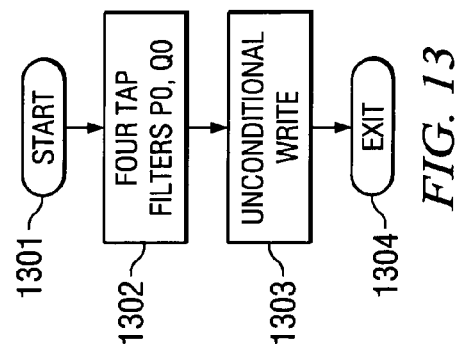
FIG. 13 illustrates the computation of p and q pixel filtering for chroma blocks according to another aspect of this invention for boundary strength less than 4.

FIG. 13 illustrates process 1300 for filtering for branch strengths less than 4 for chroma macroblocks. FIG. 13 performs the same function as the bottom of FIG. 7a for chroma macroblocks. This corresponds to one iteration of processing block 912 and to the filtering of processing block 914 of FIG. 9. Process 1300 begins with start block 1301. This start position is the equivalent of passing the boundary strength less than four test of decision block 706 illustrated in FIG. 7a. Process 1300 begins the block filtering (processing block 1302), pixel p0 is replaced by a four tap linear filtering of pixels p1, p0, q0 and q1, and pixel q0 is similarly replaced by a four tap linear filter of pixels p1, p0, q0 and q1. This filtering operation is followed by an unconditional write to memory (processing block 1303). This filtering is not conditional upon entering process 1300. Process 1300 ends via exit block 1304.

The H.264 committee proposed code employs a single pointer for both pixel read and pixel writes. This invention uses separate read and write pointers for pixel memory movement. This is helpful because of memory latency. Memory latency is the length of time in instruction cycles from issuing a memory read command until the read data returns to be stored in register and is available for use. Pipelined data processors such as illustrated in FIG. 8 often require multiple cycles for such a memory return. Employing separate read and write pointers enables the read to be scheduled ahead of the need for the data. This permits the data to be available just when needed rather than having to wait for the data to come from memory.

Figure 14:
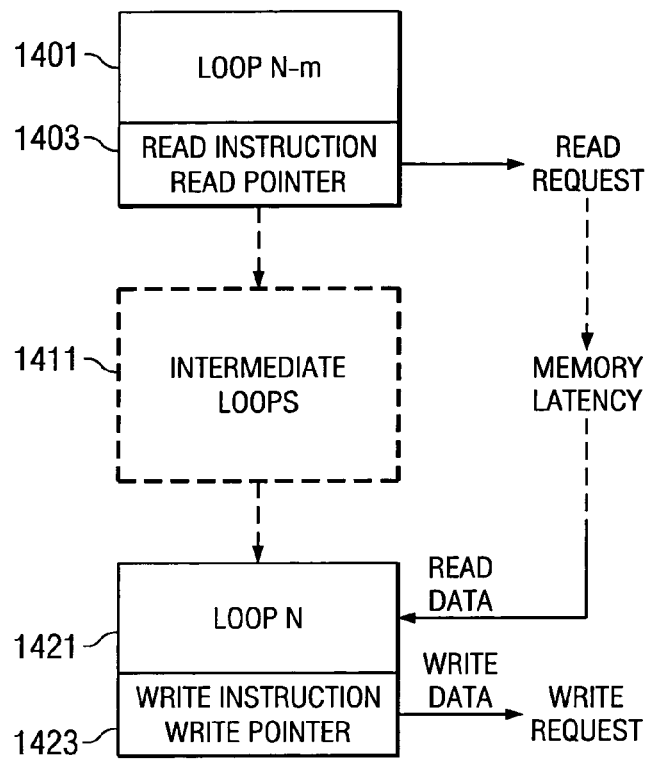
FIG. 14 illustrates the utility of separate read and write pointers in early scheduling of read commands.

FIG. 14 illustrates this technique which enables better efficiency using a pipelined, very long instruction processor such as illustrated in FIG. 8. The deblock filtering takes place in a number of loops directed to differing portions of the block or macroblock. At loop N-m 1401 a read pointer 1403 controls a read request from memory. This data is not needed until loop N 1421. During one or more intermediate loops 1411 the read request is supplied to the memory, which recalls and returns the data. The read request is scheduled enough ahead of the need for the data relative to the memory latency that the data is available when needed. Following computation in loop N 1421, the new data is written back to memory via write pointer 1423. This technique requires allocation of more registers than the prior art technique. However, data processors such as illustrated in FIG. 8 will generally have at least 32 general purpose registers. This number may be adequate for this early read scheduling depending upon the length of the memory latency.

Figure 15:
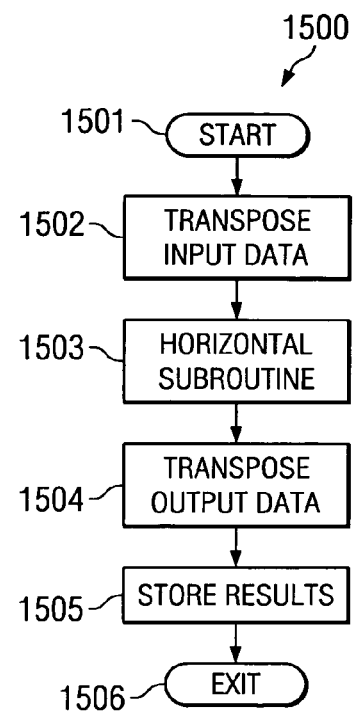
FIG. 15 illustrates reuse of SIMD code written for packed pixel data useful in filtering in one orientation to the other orientation.

FIG. 15 illustrates a further aspect of this invention. In accordance with instructions available on the data processing apparatus of FIG. 8, plural pixel data is packed into each processor data word. In this example, the data processing apparatus illustrated in FIG. 8 operates on 32 bit data words. Often the pixel data can be expressed in 8 bits. This is particularly true when luma and chroma information is separated. Thus four 8-bit pixels can be packed into each 32-bit data word. The data processing apparatus illustrated in FIG. 8 includes many instructions that operate in single instruction multiple data (SIMD) mode by separately considering plural parts of the processor data word. For example, and ADD instruction can operate separately on four 8-bit parts of the 32-bit data word by breaking the carry chain between 8-bit sections. The code example and instruction explanation below employ such SIMD instructions. The data processing apparatus of FIG. 8 also includes various multiple data manipulation instructions needed to handle packed data.

In this case the data may be packed in memory in a manner permitting easy use for one of the vertical or horizontal edges. However, the data would not be properly packed and ordered for the other orientation. The solution is illustrated in FIG. 15. First, a subroutine is written to filter a single block in one orientation. In this example it his horizontal orientation, but the particular orientation depends on the data organization in memory. The filter subroutine can be used in the other orientation according to FIG. 15.

Process 15 begins at start block 1501. Process 1300 transposes a block of data from the second orientation to the first orientation (processing block 1502). In this example, the 16 pixels of a 4 by 4 block must be shuffled into another packing order.

Figure 16:
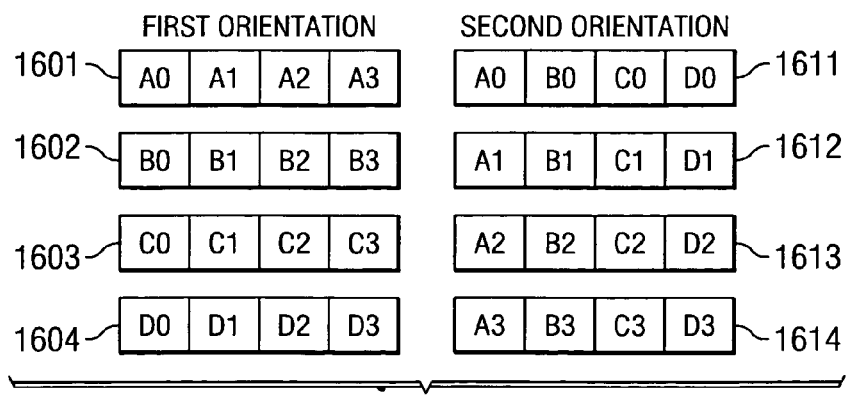
FIG. 16 illustrates the data packing according to the two orientations.

FIG. 16 illustrates these first and second orientations. The first orientation includes data words 1601, 1602, 1603 and 1604. Data word 1601 includes pixels A0, A1, A2 and A4. Data word 1602 includes pixels B0, B1, B2 and B4. Data word 1603 includes pixels C0, C1, C2 and C4. Data word 1604 includes pixels D0, D1, D2 and D4. The second orientation includes data words 1611, 1612, 1613 and 1614. The pixels are rotated in this second orientation. Data word 1611 includes pixels A0, B0, C0 and D0. Data word 1612 includes pixels A1, B1, C1 and D1. Data word 1613 includes pixels A2, B2, C2 and D2. Data word 1614 includes pixels A3, B3, C3 and D4.

Next, process 1500 performs the filter computation on the block according to the original subroutine (processing block 1503). Process 1500 then transforms the results back into the other orientation (processing block 1504). The results are stored (processing block 1505) and process 1500 ends via exit block 1506. This transformation requires additional computing time for each block. However, it takes advantage of a change in data orientation to permit SIMD operation for both vertical edge filtering and horizontal edge filtering.

The benefits of this invention over the conventional approach can be seen by comparing all the implementations to that of the natural C code version. A straight C code port of the technique of this invention results in a better scheduled loop resulting in a performance improvement of two to three times. Further improvements that can leverage the SIMD compares and the use of instructions such as AND, ANDN of the Texas Instruments TMS320C6400 digital signal processor result in a consistent five to six times speedup over the conventional approach. This advantage is mainly due to the additional parallelism that is exposed to the compiler by showing multiple unconditional blocks of code.

Table 1 summarizes these results. For a complete D1 (720 by 480) frame this technique cuts the core processing cycles from 12.33 Mcycles to 2.6 Mcycles. This provides of about 6.165 times over the conventional approach.

TABLE 2

| File Name | p-SA | n-SA | Intrinsic C | Optimized C | Natural C |
|---|---|---|---|---|---|
| Edgeloop_Str4_Horz_Intra_Luma | 251 | 398 | 358 | 452 | 1043 |
| Edgeloop_Str4_Vert_Intra_Luma | 231 | 283 | 440 | 452 | 1183 |
| Edgeloop_Str3_Horz_Intra_Luma | 394 | 451 | 1023 | 813 | 2466 |
| Edgeloop_Str3_Vert_Intra_Luma | 576 | 675 | 749 | 751 | 2520 |
| Edgeloop_Str4_Horz_Intra_ChromaUV | 86 | 93 | 274 | 274 | 272 |
| Edgeloop_Str4_Vert_Intra_ChromaUV | 111 | 141 | 274 | 274 | 272 |

TABLE 2-continued

| File Name | p-SA | n-SA | Intrinsic C | Optimized C | Natural C |
|---|---|---|---|---|---|
| Edgeloop_Str3_Horz_Intra_ChromaUV | 107 | 112 | 204 | 459 | 682 |
| Edgeloop_Str3_Vert_Intra_ChromaUV | 155 | 165 | 341 | 459 | 700 |
| Total De-Block Cycles for 720 × 480 Intra frame | 2.6 M | 3.2 M | 4.8 M | 5.2 M | 12.3 M |

For the strength 3 and other strength cases the loop deblocking works on multiple blocks within an edge and multiple edges within a macroblock. Techniques such as loop coalescing can be used to fuse both the loops together to expose additional levels of parallelism. One possible instantiation of such a code for the specific case of strength 3, which works on all four blocks of an edge and on three vertical edges that implements loop coalescing is shown below.

It turns out that this loop software pipelines an 11-cycle loop with 4 iterations in parallel and hence all the input parameters including the block address, strength can be changed on a block to block basis allowing this same technique to be equally applicable for all other strengths as well. The 11-cycle loop and the fact that it takes 4 iterations in parallel is strictly a function of the latency of the load operations and the individual operations used to do the arithmetic. On general VLIW architectures this may require more than 4-iterations. However the fact that this software pipelined loop with the latencies of the TMS320C6400 DSP requires only a minimum of four iterations in parallel allows one to not only filter as small as one 4 by 4 block within a macroblock but also vary the strengths and the blocks which get filtered on a block by block basis. This allows the implementation to be flexible and general enough without loosing out on any performance. The 11-cycle software pipelined loop which requires only 4 iterations in parallel is shown below:

```
;* ----------------------------------------------------------------*
;*   SOFTWARE PIPELINE INFORMATION
;*
;*      Loop source line                       : 154
;*      Loop closing brace source line         : 360
;*      Known Minimum Trip Count               : 48
;*      Known Max Trip Count Factor            : 1
;*      Loop Carried Dependency Bound(^)       : 3
;*      Unpartitioned Resource Bound           : 11
;*      Partitioned Resource Bound(*)          : 11
;*      Resource Partition:
;*                                   A-side      B-side
;*      .L units                        9           9
;*      .S units                        5           6
;*      .D units                        4           2
;*      .M units                        5           4
;*      .X cross paths                  7           6
;*      .T address paths                3           3
;*      Long read paths                 0           0
;*      Long write paths                0           0
;*      Logical  ops (.LS)              2           2     (.L or .S unit)
;*      Addition ops (.LSD)            10          14     (.L or .S or .D
;*         unit)
;*      Bound(.L .S .LS)                8           9
;*      Bound(.L .S .D .LS .LSD)       10          11*
;*
;*      Searching for software pipeline schedule at . . .
;*         ii = 11 Schedule found with 4 iterations in parallel
;*      Done
;* ----------------------------------------------------------------*
L2:       ; PIPED LOOP KERNEL
DW$L$_Edgeloop_Str3_Vert_Intra_Luma_sa$3$B:
          MVD        .M1    A_flg_aq,A_flg_aq$2 ; |217| <0,28> Split a
                                                           long life
||        SHRU       .S2    B_temp0,0x18,B_flg_LBeta' ; |237| <0,28>
||        ADD        .D2    B_L1_add,B_RL0_div2,B_val_L1$4 ; |327| <0,28>
||        MAX2       .L2    B_dif$1,B_c0_neg,B_dif ; |296| <0,28>
||        CMPGT      .L1    A_Alpha',A_AbsDelta,A_flg_Delta ; |247|
                                                           <0,28>
||        MPYU4      .M2    B_UNPK_val,B_L_1032,B_L10_data:B_L32_data;
                                                           <1,17>
|| [!A_pel] ADDAW    .D1    A_Ptr',A_edge,A_SrcPtr_r ; |155| <2,6>^
          MV         .D2X   A_SrcPtr_w',B_SrcPtr_w ; |351| <0,29>
||        SHR        .S2    B_val_L1$4,0x1,B_val_L1$3 ; |328| <0,29>
||        MIN2       .L2    B_dif,B_c0,B_dif ; |297| <0,29>
||        ADD        .S1X   A_R1_add,B_RL0_div2,A_val_R1 ; |341| <0,29>
||        AND        .D1    A_flg_RBeta,A_flg_Delta,A_flg_temp ; |265|
                                                           <0,29>
||        DOTPSU4    .M2    B_L1_MPY_val,B_L_1032,B_L1_add ; |326| <1,18>
||        SUBABS4    .L1    A_R_3210,A_R_2301,A_temp0 ; |227| <1,18>
||        MPY2       .M1    A_R10_data,A_1,A_R1_data:A_R0_data ; |197|
                                                           <1,18>
          CMPGT2     .S2    B_Beta',B_flg_LBeta',B_flg_LBeta ; |238|
                                                           <0,30>
```

-continued

| | | | | |
|---|---|---|---|---|
| || | ADD | .D2 | B_L0_data,B_dif,B_dif_L0' ; \|299\| <0,30> |
| || | MAX2 | .L2 | B_val_L1$3,B_C0_neg,B_val_L1$2 ; \|330\| <0,30> |
| || | SHR | .S1 | A_val_R1,0x1,A_val_R1$1 ; \|342\| <0,30> |
| || | SUBABS4 | .L1 | A_R10_data,A_R32_data,A_flg_temp$1 ; \|215\| <1,19> |
| || | DOTPSU4 | .M1 | A_R1_MPY_val,A_R_2301,A_R1_add ; \|340\| <1,19> |
| || | LDNDW | .D1T1 | *-A_SrcPtr_r(4),A_R_3210:A_L_0123 ; \|168\| <2,8> |
| | MIN2 | .L2 | B_val_L1$2,B_C0,B_val_L1$1 ; \|331\| <0,31> |
| || | SUB | .L1X | A_R0_data,B_dif,A_dif_R0$2 ; \|300\| <0,31> |
| || | AND | .D2X | B_flg_LBeta,A_flg_temp,B_flg_comb ; \|266\| <0,31> |
| || | AND | .D1 | A_AND_val,A_flg_temp$1,A_flg_aq$1 ; \|216\| <1,20> |
| || | ADD | .S2 | 0x4,B_L_val$1,B_L_val ; \|286\| <1,20> |
| || [!A_pel] | MVK | .S1 | 0x10,A_pel ; \|156\| <2,9> |
| | ADD | .S2 | B_L1_data,B_val_L1$1,B_val_L1 ; \|333\| <0,32> |
| || | AND | .D2 | B_flg_ap,B_flg_comb,B_flg_comb_ap ; \|269\| <0,32> |
| || | MAX2 | .L1X | A_val_R1$1,B_C0_neg,A_val_R1$2 ; \|344\| <0,32> |
| || | AND | .S1 | A_temp0,A_AND_val,A_flg_RBeta$1 ; \|228\| <1,21> |
| || | SUBABS4 | .L2 | B_L10_data,B_L32_data,B_flg_temp ; \|219\| <1,21> |
| || | MPY2 | .M2 | B_L10_data,B_1,B_L1_data:B_L0_data ; \|208\| <1,21> |
| || [A_pel] | ADD | .D1 | 0xffffffff,A_pel,A_pel ; \|159\| <2,10> |
| | MAX2 | .L2 | B_ZERO_val,B_dif_L0',B_dif_L0' ; \|302\| <0,33> |
| || | BDEC | .S2 | L2,LPCNT ; \|360\| <0,33> |
| || | MIN2 | .L1X | A_val_R1$2,B_C0,A_val_R1$1 ; \|345\| <0,33> |
| || | MVD | .M1 | A_R1_data,A_R1_data' ; \|197\| <1,22> Split a long life |
| || | AND | .D2 | B_AND_val,B_flg_temp,B_flg_ap' ; \|220\| <1,22> |
| || | CMPGT2 | .S1 | A_Beta,A_flg_aq$1,A_flg_aq ; \|217\| <1,22> |
| || [!A_pel] | ADD | .D1 | 0x1,A_edge,A_edge ; \|154\| <3,0> |
| [ B_flg_comb_ap] | STB | .D2T2 | B_val_L1,*-B_SrcPtr_w(2) ; \|357\| <0,34> |
| || | MIN2 | .L2 | B_255_val,B_dif_L0',B_dif_L0 ; \|303\| <0,34> |
| || | ADD | .L1 | A_R1_data',A_val_R1$1,A_val_R1 ; \|347\| <0,34> |
| || | AND | .D1X | A_flg_aq$2,B_flg_comb,A_flg_comb_aq ; \|268\| <0,34> |
| || | SUB | .S2 | 0x0,B_C0,B_C0_neg ; \|324\| <1,23> |
| || | ADD | .S1 | A_SrcPtr_r,B_width,A_SrcPtr_r ; \|175\| <2,12> |
| || | MVD | .M1 | A_SrcPtr_r,A_SrcPtr_w ; \|157\| <2,12> |
| [ B_flg_comb] | STB | .D2T2 | B_dif_L0,*-B_SrcPtr_w(1) ; \|353\| <0,35> |
| || | CMPGT2 | .S1 | A_Beta,A_flg_RBeta$1,A_flg_RBeta ; \|229\| <1,24> |
| || | ADD | .D1X | A_R_val,B_L_val,A_dif$1 ; \|287\| <1,24> |
| || | CMPGT2 | .S2 | B_Beta',B_flg_ap',B_flg_ap ; \|221\| <1,24> |
| || | ADD | .L2X | B_C0,A_flg_aq,B_c0_temp ; \|253\| <1,24> |
| || | SWAP4 | .L1 | A_R_3210,A_R_2301 ; \|181\| <2,13> |
| || | DOTPSU4 | .M1 | A_dif_MPY_val,A_R_3210,A_R_val ; \|282\| <2,13> |
| || | MAX2 | .L1 | A_ZERO_val,A_dif_R0$2,A_dif_R0$1 ; \|305\| <0,36> |
| || [ A_flg_comb_aq] | STB | .D1T1 | A_val_R1,*+A_SrcPtr_w'(1) ; \|358\| <0,36> |
| || | SUBABS4 | .L2 | B_L_0123,B_L_1032,B_temp0 ; \|235\| <1,25> |
| || | SHRU | .S1 | A_dif$1,0x3,A_dif ; \|288\| <1,25> |
| || | ADD | .S2 | B_flg_ap,B_c0_temp,B_c0 ; \|254\| <1,25> |
| || | ADD | .D2X | B_L0_data,A_R0_data,B_RL0 ; \|317\| <1,25> |
| || | MPYU4 | .M1 | A_UNPK_val,A_R_3210,A_R32_data:A_R10_data ; <2,14> |
| | MIN2 | .L1 | A_255_val,A_dif_R0$1,A_dif_R0 ; \|306\| <0,37> |
| || | ROTL | .M1 | A_SrcPtr_w,0,A_SrcPtr_w' ; \|157\| <1,26> Split a long |
| || | AND | .S2 | B_temp0,B_AND1_val,B_temp0 ; \|236\| <1,26> |
| || | SUB | .S1X | A_R0_data,B_L0_data,A_Delta ; \|244\| <1,26> |
| || | SUB | .L2 | 0x0,B_c0,B_c0_neg ; \|295\| <1,26> |
| || | MV | .D2X | A_L_0123,B_L_0123 ; \|169\| <2,15> |
| [ B_flg_comb] | STB | .D1T1 | A_dif_R0,*A_SrcPtr_w' ; \|354\| <0,38> |
| || | MV | .D2X | A_dif,B_dif$1 ; \|289\| <1,27> |
| || | SHRU | .S2 | B_RL0,0x1,B_RL0_div2 ; \|318\| <1,27> |
| || | ABS | .L1 | A_Delta,A_AbsDelta ; \|245\| <1,27> |
| || | DOTPSU4 | .M2 | B_dif_MPY_val,B_L_0123,B_L_val$1 ; \|278\| <2,16> |
| || | SWAP4 | .L2 | B_L_0123,B_L_1032 ; \|182\| <2,16> |

Each instruction in this listing are written in a predetermined format. The instructions are grouped in execute packets of instructions that can execute at the same time. The "| |" symbol at the beginning of a line indicates that this instruction executes on the same instruction cycle as the prior instruction. This instruction scheduling is fixed at compile time.

Second, the instruction lists the predication register and sense in square brackets, if any. In the TMS320C6400, any instruction may be predicated upon the data stored in a predetermined set of condition data registers. A condition register field in each instruction determines the condition register for the current instruction. For predication with the normal sense, the instruction executes if the condition register is nonzero. For predication in the opposite sense, the instruction executes if the condition register is zero. The code above notes the opposite sense by a "!" symbol before the condition register designation. Each instruction includes a z condition sense bit which designates the sense of the condition. One combination of the condition register field and the z bit indicates unconditional instruction operation.

Next, each instruction includes an instruction mnemonic indicating the type of instruction. The instruction types used in this example and their corresponding functions are listed below. Some instructions can be executed on more than one unit type and other instructions can be executed one only a corresponding unit type. The instructions used in this loop are described below.

ADD Signed or Unsigned Integer Addition without Saturation

This instruction adds the data in the first source register to the data in the second source register and stores the results in the destination register. Depending on the options selected by the instruction, the input quantities could be treated as signed or unsigned integers.

ADDAW Integer Addition Using Addressing Mode

This instruction adds first source register to second source register using the addressing mode specified for the second source register. The addition defaults to linear mode. However, if second source register is one of A4-A7 or B4-B7, the mode can be changed to circular mode. The "W" at the end of this mnemonic designates a word (32 bit) mode. The result is placed in destination register.

AND Signed or Unsigned Integer Addition without Saturation

This instruction forms the logical AND of the bits in the first and second source operands and stores the results in the destination operand.

BDEC Branch and Decrement

If the predication and decrement register (destination register) is positive (greater than or equal to 0), this instruction performs a relative branch and decrements the destination register by one. The instruction performs the relative branch using a 10-bit signed constant specified by the an immediate field in the instruction. The constant is shifted 2 bits to the left, then added to the address of the first instruction of the fetch packet that contains the instruction. The result is placed in the program fetch counter. This instruction helps reduce the number of instructions needed to decrement a register and conditionally branch based upon the value of the register. Note also that any register can be used which can free the predicate registers (A0-A2 and B0-B2) for other uses.

CMPGT Signed or Unsigned Integer Compare for Greater than

This instruction does a signed or unsigned comparison of first source register to second source register. If first source register is greater than second source register, then 1 is written to destination register. Otherwise, 0 is written to destination register.

CMPGT2 Compare for Greater than, Packed 16-Bit

This instruction performs comparisons for greater than values on signed, packed 16-bit data. Each signed 16-bit value in first source register is compared against the corresponding signed 16-bit value in second source register, returning a 1 if first source register is greater than second source register or returning a 0 if it is not greater. The comparison results are packed into the two least-significant bits of destination register. The result for the lower pair of values is placed in bit 0, and the results for the upper pair of values are placed in bit 1. The remaining bits of destination register are set to 0.

DOTPSU4 Dot Product, Signed by Unsigned Packed 8-Bit

This instruction returns the dot-product between four sets of packed 8-bit values. The values in first source register are treated as signed packed 8-bit quantities, whereas the values in the second source register are treated as unsigned 8-bit packed data. The signed result is written into the destination register. For each pair of 8-bit quantities in first source register and second source register, the signed 8-bit value from first source register is multiplied with the unsigned 8-bit value from second source register. The four products are summed together, and the resulting dot product is written as a signed 32-bit result to destination register.

LDNDW Load Non-Aligned Double Word

This instruction loads a 64-bit quantity from memory into an even-odd register pair: destination register_odd; destination register_even. The LDNDW instruction may read a 64-bit value from any byte boundary and alignment to a 64-bit boundary is not required. The memory effective address is formed from a base address register (baseR) and an optional offset that is either a register (offsetR) or a 5-bit unsigned constant from an instruction immediate field. Both offsetR and baseR must be in the same register file and on the same data path as the .D unit used. The y bit in the opcode determines the .D unit and register file used: y=0 selects the .D1 unit and baseR and offsetR from the A register file, and y=1 selects the .D2 unit and baseR and offsetR from the B register file. This instruction supports both scaled offsets and non-scaled offsets. The sc field is used to indicate whether the offsetR or immediate constant is scaled or not. If sc is 1 (scaled), the offsetR or immediate constant is shifted left 3 bits before adding or subtracting from the baseR. If sc is 0 (non-scaled), the offsetR or immediate constant is not shifted before adding or subtracting from the baseR. For the pre-increment, pre-decrement, positive offset, and negative offset address generator options, the result of the calculation is the address to be accessed in memory. For post-increment or post decrement addressing, the value of baseR before the addition or subtraction is the address to be accessed from memory. The addressing arithmetic that performs the additions and subtractions defaults to linear mode. However, for register A4 to A7 and for registers B4 to B7, the mode can be changed to circular mode. The destination register field of the instruction selects a register pair, a consecutive even-numbered and odd-numbered register pair from the same register file. The instruction can be used to load a pair of 32-bit integers. The least significant 32 bits are loaded into the even-numbered register and the most significant 32 bits are loaded into the next register which is always an odd-numbered register. The destination register can be in either register file, regardless of the .D unit or baseR or offsetR used. The s bit determines which file destination register will be loaded into: s=0 indicates destination register will be in the A register file and s=1 indicates destination register will be loaded in the B register file.

MAX2 Signed or Unsigned Integer Addition without Saturation

This instruction performs a maximum operation on packed signed 16-bit values. For each pair of signed 16-bit values in first source register and second source register, this instruction places the larger value in the corresponding position in destination register.

MIN2 Minimum, Signed Packed 16-Bit

This instruction performs a minimum operation on packed, signed 16-bit values. For each pair of signed 16-bit values in first source register and second source register, this instruction places the smaller value in the corresponding position in destination register.

MPY2 Multiply Signed by Signed, Packed 16-Bit

This instruction performs two 16-bit by 16-bit multiplications between two pairs of signed, packed 16-bit values. The values in first source register and second source register are treated as signed, packed 16-bit quantities. The 32-bit results are written into a 64-bit register pair. The product of the lower half-words of first source register and second source register is written to the even destination register. The product of the upper half-words of first source register and second source register is written to the odd destination register.

MPYU4 Multiply Unsigned by Unsigned Packed, 8-Bit

This instruction returns the product between four sets of packed 8-bit values producing four unsigned 16-bit results that are packed into a 64-bit odd-even register pair. The values in both first source register and second source register are treated as unsigned 8-bit packed data. For each pair of 8-bit quantities in first source register and second source register, the unsigned 8-bit value from first source register is multiplied with the unsigned 8-bit value from second source register. The product of first source register byte 0 and second source register byte 0 is written to the lower half of the even destination register. The product of first source register byte 1 and second source register byte 1 is written to the upper half of the even destination register. The product of first source register byte 2 and second source register byte 2 is written to the lower half of the odd destination register. The product of first source register byte 3 and second source register byte 3 is written to the upper half of odd destination register.

MV Move from Register to Register

This instruction moves data from one register to another.

MVD Move from Register to Register, Delayed

This instruction moves data from the second source register to the destination register over 4 instruction cycles. This instruction uses the multiplier path and thus can only be performed by one of the M units (.M1 or .M2).

MVK Move a 16-Bit Signed Constant into a Register and Sign Extend

This instruction sign extends a 16-bit constant and places the results in the destination register.

ROTL Rotate Left

This instruction rotates the 32-bit value of the second source register to the left and places the result in destination register. The number of bits to rotate is given in the five least-significant bits of first source register. Bits 5 through 31 of the first source register are ignored and may be non-zero.

SHR Arithmetic Shift Right

This instruction shifts the contents of the second source register to the right by value in the first source register. The sign-extended result is placed in destination register.

SHRU Shift Right, Unsigned Packed 16-Bit

This instruction performs an arithmetic shift right on unsigned, packed 16-bit quantities. The values in the second source register are treated as unsigned, packed 16-bit quantities. The lower five bits of the first source register designate the shift amount. The results are placed in an unsigned, packed 16-bit format into the destination register. For each unsigned 16-bit quantity in the second source register, the quantity is shifted right by the number of bits specified in the lower five bits of the first source register. Bits 5 through 31 of the first source register are ignored and may be non-zero. The shifted quantity is zero extended, and placed in the corresponding position in the destination register. Bits shifted out of the least-significant bit of the signed 16-bit quantity are discarded.

SUB Signed or Unsigned Integer Subtraction without Saturation

This subtracts the contents of the second source register from the contents of the first source register. The result is placed in the destination register.

SUBABS4 Subtract with Absolute Value, Unsigned Packed 8-Bit

This instruction calculates the absolute value of the differences between the packed 8-bit data contained in the source registers. The values in the first source register and second source register are treated as unsigned, packed 8-bit quantities. The result is written into the destination register in an unsigned, packed 8-bit format. For each pair of unsigned 8-bit values in the first source register and second source register, the absolute value of the difference is calculated. This result is then placed in the corresponding position in the destination register. Specifically, the absolute value of the difference between first source register byte0 and second source register byte0 is placed in byte0 of destination register. The absolute value of the difference between first source register byte1 and second source register byte1 is placed in byte1 of destination register. The absolute value of the difference between first source register byte2 and second source register byte2 is placed in byte2 of destination register. And the absolute value of the difference between first source register byte3 and second source register byte3 is placed in byte3 of destination register.

SWAP4 Swap Bytes in each Half-Word

This instruction exchanges pairs of bytes within each half-word of second source register, placing the result in destination register. The values in second source register are treated as unsigned, packed 8-bit values. Specifically the upper byte in the upper half-word is placed in the lower byte in the upper halfword, while the lower byte of the upper half-word is placed in the upper byte of the upper half-word. Also the upper byte in the lower halfword is placed in the lower byte of the lower half-word, while the lower byte in the lower half-word is placed in the upper byte of the lower half word.

The next indication in these instructions is of the scheduled functional unit. These are designated as .L1, .S1, .D1, .M1, .L2, .S2, .D2 and .M2. The prefix designates the kind of functional unit. The suffix designates the data path. In the TMS320C6000 and TMS320C6400 the particular functional unit for each instruction is fixed at compile time. Those functional unit designations with an "X" suffix designate instructions that use a cross register path to channel data from one register file to a functional unit of the other data path.

Finally, the instructions include register mnemonics. These are listed in the following order: the first source register; the second source register; and the destination register. Some instructions include only two register operands listed in the following order: source register; and destination register. Those with "A" prefixes are from register file A 21. Those with "B" prefixes are from register file B 31.

What is claimed is:

1. A method for filtering block artifacts of macroblock and block oriented video compression, wherein the method includes filtering at a first boundary strength for block edges which are macroblock edges of intra coded macroblocks and filtering at a second boundary strength lower than said first boundary strength for block edges which are not macroblock edges of intra coded macroblocks, the improvement comprising:

computing all possible filter results speculatively and simultaneously in parallel;
computing conditions for application of corresponding filter results simultaneously in parallel by determining if a current macroblock is an intra coded macroblock;
if said current macroblock is an intra coded macroblock, then
filtering a first macroblock edge at said first boundary strength, and
filtering interior macroblock edges at said second boundary strength; and
writing filter results to memory conditionally dependent upon computed corresponding conditions.

2. The method of claim 1, wherein each macroblock consists of a four by four matrix of blocks, the improvement wherein:

said step of writing to filter results to memory conditionally dependent upon computed corresponding conditions includes filtering four edge blocks at said first strength; and
said step of interior macroblock edges at said second boundary strength includes filtering twelve non-edge blocks at said second strength.

3. The method of claim 1, wherein the block filtering includes separate filtering of vertical edges and horizontal edges, the improvement further comprising the steps of:

packing plural image pixels into each data word;
said step of computing all possible filter results speculatively and simultaneously in parallel for a first of the vertical or horizontal edges includes computing in a single instruction multiple data fashion on plural image pixels in each data word simultaneously for individual blocks; and
said step of computing all possible filter results speculatively and simultaneously in parallel for a second of the vertical or horizontal edges different from the first includes
transposing a block of image pixels from a first orientation according to second of the vertical or horizontal edges to a second orientation according to the first of the vertical or horizontal edges,
computing in a single instruction multiple data fashion on plural image pixels in each data word simultaneously according to the single instruction multiple data fashion on plural image pixels in each data word simultaneously, and
transposing a block of image pixels resulting from the single instruction multiple data computing from said second orientation to said first orientation.

4. The method of claim 1, wherein each macroblock consists of a four by four matrix of blocks, wherein the method includes filtering at a differing boundary strengths for block edges dependent upon characteristics of each block, the improvement further comprising:

computing a boundary strength for each block edge to be filtered;
storing said computed boundary strengths;
for each block computing filter results by
recalling a corresponding stored boundary strength for said block,
selecting a filter computation for said block dependent upon said recalled boundary strength, and
computing filter results from said selected filter computation.

* * * * *